United States Patent
Ferragut, II

(10) Patent No.: US 6,715,302 B2
(45) Date of Patent: Apr. 6, 2004

(54) MENU-BASED CONTROL SYSTEM FOR REFRIGERATOR THAT PREDICTS ORDER AND REPLACE DATES FOR FILTERS

(75) Inventor: Nelson J. Ferragut, II, Williamsburg, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/195,200

(22) Filed: Jul. 15, 2002

(65) Prior Publication Data
US 2003/0010043 A1 Jan. 16, 2003

Related U.S. Application Data
(60) Provisional application No. 60/305,719, filed on Jul. 16, 2001.

(51) Int. Cl.⁷ .............................................. G01K 13/00
(52) U.S. Cl. .............................. 62/129; 236/94; 62/127
(58) Field of Search ........................... 62/129, 62, 126, 62/127, 130; 236/51, 94

(56) References Cited

U.S. PATENT DOCUMENTS

| | | | |
|---|---|---|---|
| 3,836,221 A | | 9/1974 | Whistler, Jr. et al. |
| 4,514,724 A | | 4/1985 | Valentine |
| 4,966,004 A | | 10/1990 | Midlang et al. |
| 5,387,108 A | | 2/1995 | Crowell |
| 5,454,427 A | * | 10/1995 | Westbrooks et al. ........ 165/267 |
| 5,487,276 A | * | 1/1996 | Namisniak et al. ........... 62/125 |
| 5,577,918 A | | 11/1996 | Crowell |
| 5,797,445 A | * | 8/1998 | Westbrooks et al. ........ 165/11.1 |
| 5,868,195 A | * | 2/1999 | Westbrooks, Jr. ........... 165/267 |
| 5,900,801 A | * | 5/1999 | Heagle et al. ............ 340/286.09 |
| 5,903,869 A | | 5/1999 | Jacobson et al. |
| 5,939,974 A | * | 8/1999 | Heagle et al. ............ 340/286.09 |
| 6,286,330 B1 | * | 9/2001 | Kopf .............................. 62/314 |
| 6,375,834 B1 | * | 4/2002 | Gusses et al. ................. 210/85 |
| 6,393,848 B2 | * | 5/2002 | Roh et al. ....................... 62/126 |
| 6,442,952 B2 | * | 9/2002 | Roh et al. ....................... 62/127 |
| 6,453,687 B2 | * | 9/2002 | Sharood et al. ................ 62/127 |
| 6,483,695 B1 | * | 11/2002 | Hartstein ..................... 361/680 |
| 6,608,560 B2 | * | 8/2003 | Abrams .................. 340/539.14 |
| 2001/0052741 A1 | | 12/2001 | Yun |
| 2001/0054291 A1 | | 12/2001 | Roh et al. |
| 2002/0080273 A1 | * | 6/2002 | Harrison et al. |
| 2003/0056526 A1 | * | 3/2003 | Holmes et al. |

FOREIGN PATENT DOCUMENTS

| | | | |
|---|---|---|---|
| AU | 200039364 | 6/2000 | |
| DE | 3708722 | 10/1987 | |
| EP | 1110627 | 6/2001 | |
| EP | 1221578 | 10/2002 | |
| KR | 2001111106 A | * 12/2001 | ........... F25D/29/00 |
| KR | 2001113352 A | * 12/2001 | ........... F25D/11/00 |
| WO | WO 97/50045 | 12/1997 | |

* cited by examiner

Primary Examiner—William E. Tapolcai
Assistant Examiner—Mohammad M. Ali
(74) Attorney, Agent, or Firm—McKee, Voorhees & Sease, P.L.C.

(57) ABSTRACT

A refrigerator includes a cabinet for enclosing a refrigerating compartment, the cabinet having a door for providing access to the refrigerating compartment, a user interface operatively connected to the cabinet having a display for displaying refrigerator function selections and a plurality of buttons for selecting refrigerator functions and a control unit operatively connected to the user interface and adapted to control a plurality of refrigerator functions. The control unit can be adapted for determining refrigerator filter information and displaying refrigerator filter information, the refrigerator filter information can include a date associated with the refrigerator filter.

21 Claims, 6 Drawing Sheets

MENU-BASED CONTROL SYSTEM FOR REFRIGERATOR THAT PREDICTS ORDER AND REPLACE DATES FOR FILTERS

PRIORITY STATEMENT

This application claims priority to U.S. Provisional Patent Application No. 60/305,719 filed on Jul. 16, 2001, herein incorporated by reference in its entirety.

BACKGROUND OF THE INVENTION

The present invention relates to refrigerators. Refrigerators store food as their primary function. Yet, this is not the only role that refrigerators play in many installations. People often use refrigerators in other ways. For example, notes are sometimes stuck on the refrigerator using magnets or otherwise. Although a convenient location to place notes or reminders for one another, this can result in a cluttered appearance created by paper notes adhered to the refrigerator or stuck to the refrigerator by magnets.

Refrigerators also sometimes provide functions related to their own maintenance. For example, refrigerators sometimes include visual indicators to alert consumers as to when the water filter should be changed. The visual indicators are often lights. For example a green light can indicate that the filter is not yet due for a change, a yellow light can indicate that the filter should be changed soon, and a red light indicates that the filter should be changed.

Thus, refrigerators can have various functions in addition to storing food, yet problems remain. What is needed is a refrigerator that can provide for additional functions through use of a consistent user interface.

Therefore, it is a primary object of the present invention to improve upon the state of the art.

It is a further object of the present invention to provide a refrigerator that provides a consistent user interface.

It is another object of the present invention to provide a refrigerator capable of providing information regarding refrigerator maintenance including information regarding the replacement of air and/or water filters.

Yet another object of the present invention is to provide a refrigerator that determines when the air or water filter should be replaced.

It is a further object of the present invention to provide a refrigerator that is capable of recording and playing back audio messages.

These and/or other objects, features, and/or advantages of the present invention will be apparent from the following specification and claims.

SUMMARY OF THE INVENTION

The present invention provides for a refrigerator having a consistent user interface that can be used for multiple purposes. The user interface can be used to provide message recording and playback functions. The user interface can also be used to provide for the display of air filter and water filter replacement information. The air filter and/or water filter replacement information can include information such as the remaining capacity of the filter, an estimated replacement date for the filter, an estimated date by which the replacement filter should be ordered.

According to one aspect of the present invention, the refrigerator includes a cabinet for enclosing a refrigerating compartment, the cabinet having a door for providing access to the refrigerating compartment. The refrigerator also includes a user interface operatively connected to the cabinet having a display for displaying refrigerator function selections and a plurality of buttons for selecting refrigerator functions, and a control unit operatively connected to the user interface and adapted to control a plurality of refrigerator functions. The plurality of buttons in this interface can include a menu button to select one of the plurality of screens associated with the refrigerator functions as well as at least three buttons for selecting refrigerator functions associated with a menu screen displayed on the display. The refrigerator functions can include message recording functions, message playback functions, air filter replacement functions, water filter replacement functions, ice dispensement functions, water dispensement functions, clock functions, or other functions associated with the refrigerator.

According to another aspect of the present invention, a refrigerator includes a cabinet for enclosing a refrigerator compartment, a display operatively connected to the cabinet, a control unit electrically connected to the display adapted for determining refrigerator filter information and for displaying the refrigerator filter information on the display. The refrigerator filter information includes a date associated with the refrigerator filter. The date can be an estimated replacement date for the filter or the date can be an ordering date associated with the filter. The filter can be an air filter or a water filter.

Another aspect of the present invention relates to a method for providing user control of a refrigerator. The method includes providing a menu button on the refrigerator for selecting one of a plurality of refrigerator function screens, receiving a selection from a user of one of the plurality of refrigerator function screens, displaying the selected refrigerator function screen, the selected refrigerator function screen providing a plurality of refrigerator function selections, receiving a user selection of one of a plurality of refrigerator function selections, and performing the selected refrigerator function.

According to another aspect of the present invention, the present invention provides a method for providing refrigerator filter information. The method includes providing a refrigerator having a display, and displaying on the display a date associated with the refrigerator filter. The date can be an estimated replacement date for the filter or the date can be an ordering date associated with the filter. The filter can be an air filter or a water filter.

DETAILED DESCRIPTION OF THE DRAWINGS

Figure 1:
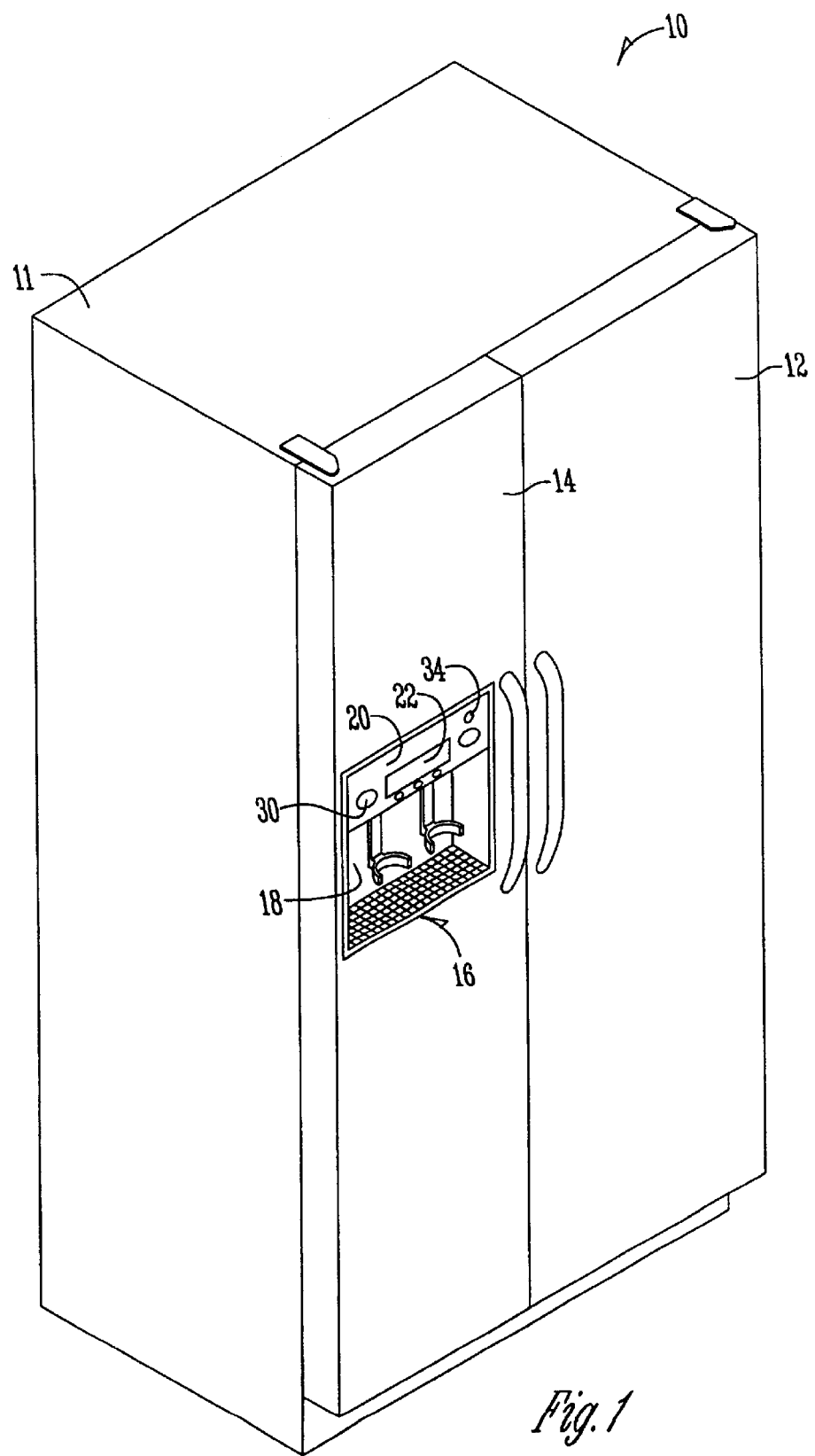
FIG. 1 is a perspective view of one embodiment of a refrigerator of the present invention.

FIG. 1 provides a perspective view of a refrigerator 10 having a side by side configuration. The refrigerator 10 includes a housing or cabinet 11. There is a refrigeration compartment door 12 and a freezer compartment door 14 to provide access to the refrigerator and freezer compartments 13, 15 within the cabinet 11. The freezer compartment door 14 contains a water and ice dispenser, generally shown at 16. The water and ice dispenser 16 include a lower receptacle 18 for receiving cups and dispensing water and ice. Above the receptacle 18 is a user interface 20. The user interface 20 includes a display 22, one or more manual inputs such as button 30, and an optional indicator light 34.

Figure 2:
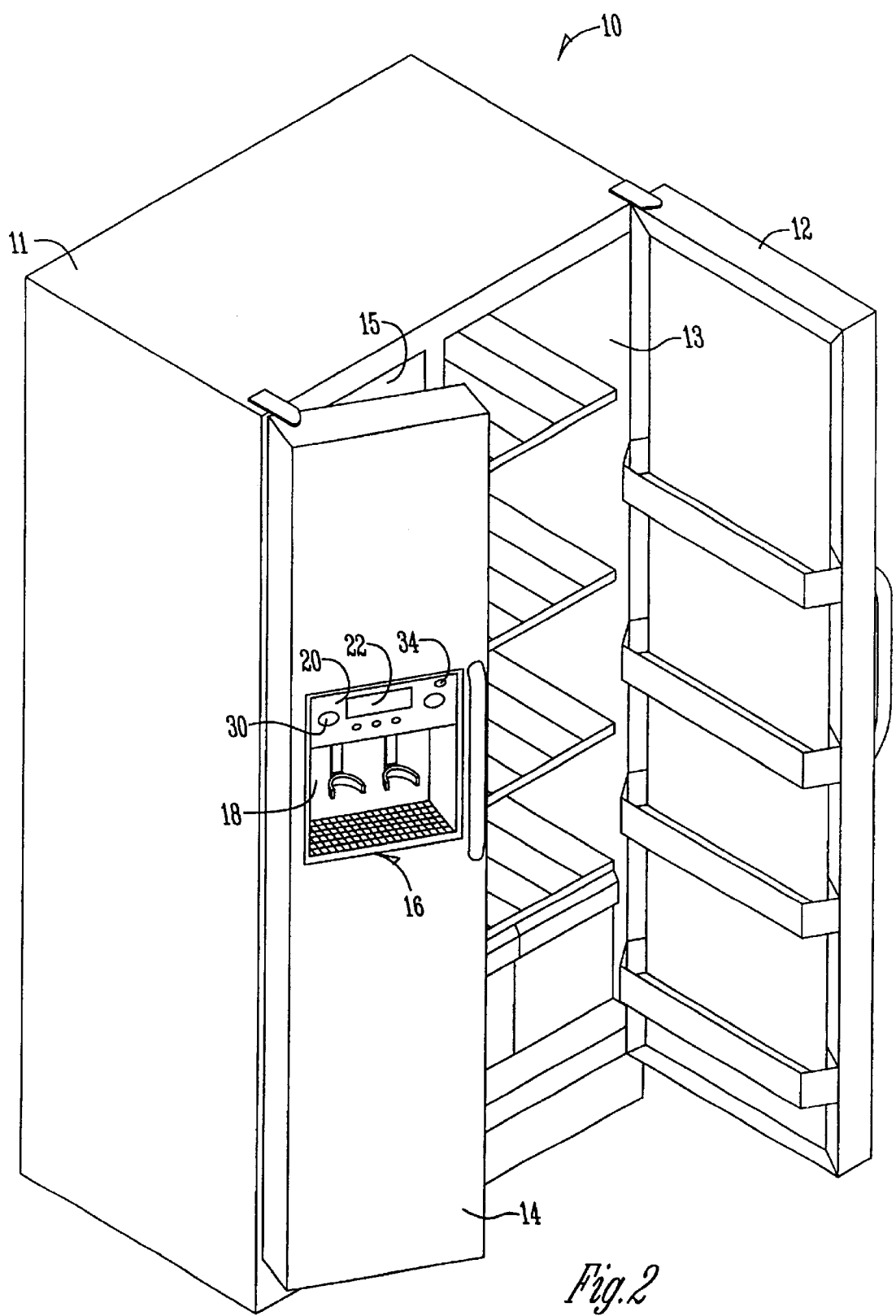
FIG. 2 is a perspective view of the embodiment of FIG. 1 showing the refrigerator with the doors open.

FIG. 2 illustrates the refrigerator 10 with an open refrigeration compartment door 12 and an open freezer compartment door 14. The open refrigeration compartment door 12 exposes the refrigeration compartment 13 within the cabinet 11. The open freezer door 14 exposes the freezer compartment 15 within the cabinet 11. Although it is preferable to place the user interface 20 and receptacle 16 in the freezer compartment door 14, the present invention is not limited to any particular placement of either the water and ice dispenser 16 or the user interface 20 or the various elements of the user interface 20.

Figure 3:
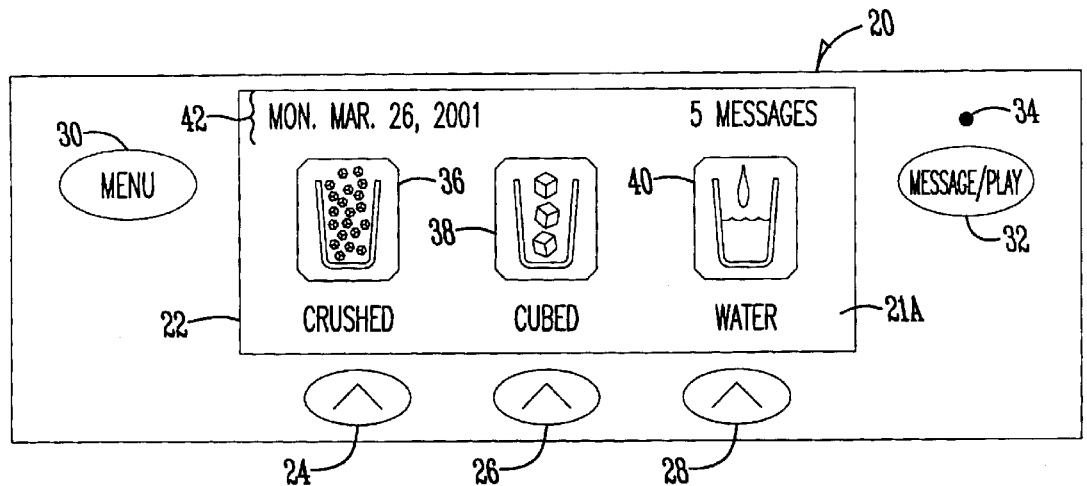
FIG. 3 is a diagram of a user interface according to one embodiment of the present invention where the display illustrates water and ice dispensement refrigerator functions.

FIG. 3 shows one view of the user interface 20 with a menu screen 21A. The user interface 20 includes a plurality of manual inputs. The button can include a left button 24, a center button 26, a right button 28 and a menu button 30. Also shown is a message/play button 32. As shown in FIG. 3, the display 22 is adapted for displaying refrigerator function selections. As shown, three icons are present. A first icon 36 is associated with the refrigerator function of dispensement of crushed ice. A second icon 38 is associated with the refrigerator function of dispensement of cubed ice. A third icon 40 is associated with the refrigerator function of dispensement of water. Each of the icons 36, 38, and 40 and its associated function is also associated with one of the buttons 24, 26, and 28, respectively such that pressing one of the buttons 24, 26, and 28, results in performing the associated refrigerator function. As shown, each of the icons 36, 38, and 40 also includes a textual label beneath it, "CRUSHED", "CUBED", and "WATER", respectively.

The menu button 30 can be used to display any number of screens. Preferably, the use of the manual input buttons 24, 26, 28 is menu-driven so that the buttons allow for the selection of different functions based upon the currently displayed information on the display 22. Other display screens can provide for selecting a language in which to display information, setting date and time information, adjusting volume information, setting a timer, checking the status of a water filter, checking the status of an air filter, or other refrigerator functions.

The user interface allows many functions to be selected using only a limited number of keys. The plurality of buttons includes the left button 24, the center button 26, and the right button 28. The menu button 30 is used to navigate through various screens. Each screen provides user access to one or more functions built into the refrigerator. The functions can include, without limitation, dispensing crushed ice, dispensing cubed ice, dispensing water, playing back a message, recording a message, controlling a kitchen timer, viewing remaining filter life, setting the date or time, and other refrigerator functions. The menu button allows a single button to be used to navigate through different screens. Within each screen, the left 24, center 26, and right 28 buttons are used as the main interface. The screens are sequentially organized from the ones that are most heavily used to the ones that are least heavily used. When the menu button is pressed, the screen changes to the next most heavily used screen until eventually it cycles to the original screen.

If the user changes to a different screen using the menu button and then stops pressing buttons, the control can automatically revert to the default screen after a predetermined time expires. A count down timer is preferably reset to 30 seconds each time one of the buttons 24, 26, and 28 is pressed. If within this time duration the user interface switches to the default screen, the default screen being the screen that the user is most likely to want to use next. Typically, the default screen is the ice and water dispensement screen 21. However, the default screen can be another screen. For example, when the dispenser is locked, a locked screen can become the default screen. When the kitchen timer has completed counting down to zero, the kitchen timer screen can become the default screen.

Normally, pressing the menu button 30 will navigate to the next screen. If the user stops the screen and presses the left 24, center 26, or right 28 button, then pressing the menu button will return the control to the default screen. The present invention contemplates variations in the screens displayed, order of screens and other variations.

The interface also allows the user to select what type of audio response they will get when they press the button. The audio response can include a selection that no audio feedback should be generated in response to a button pressed. The selected feedback can be a tone so that the control generates a short tone, such as a one kilohertz tone in response to a button pressed, or a selected feedback can be voice feedback so that when certain buttons are pressed a voice message will be generated to confirm the selection made. The present invention contemplates that even if voice feedback is selected there may not be a voice message associated with each type of button pressed. For example, some buttons will generate a voice message while others may generate a tone. The present invention contemplates numerous variations in the type of feedback when a user presses a button.

A message indicator 34 such as an LED is also shown. The message indicator is used to indicate the presence or absence of unlistened to messages. Also shown in FIG. 3 is textual message status information 42 that extends across the top of the icons 36, 38, and 40. The message status information 42 provides a message date stamp indicating the date that the latest message was left and indicates that there are "5 MESSAGES" that have been stored in the user interface 20. Other message status information can also be stored and/or displayed. For example, the user interface 20 is preferably programmed to retain the following information associated with each recorded message: (1) the weekday and time of day the message was recorded; (2) whether or not the message has been listened to or played back; and (3) whether or not the message has been recorded during the current user session.

Figure 4:
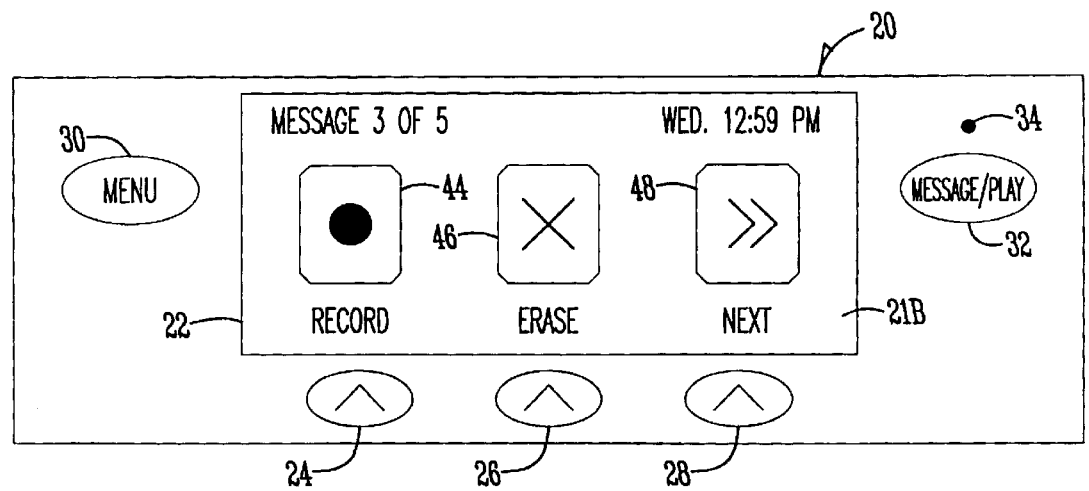
FIGS. 4, 5, and 6 are diagrams according to one embodiment of the present invention where the display shows message play back and record functions.

To begin a user session, a user presses the message button 32. This action takes the user interface 20 out of the default mode as shown in FIG. 3 and into a messaging mode such as is shown in FIG. 4. At the start of the user session, the message with the oldest date stamp that has not been heard is automatically selected and played back. If all the messages have already been heard, the oldest message is played. If there are no user messages then the message "no messages" is played. Pressing the message button 32 plays the currently selected message.

FIG. 4 illustrates one embodiment of the display 22 with a screen 21B for the instance where there are multiple (in this case 5) messages recorded and the user is provided with the opportunity to listen to the next message, erase the previous message or record a new message. The "RECORD" icon 44 indicates that when the button 24 is pressed (button 24 is located immediately below and therefore associated with icon 44), the user interface 20 will be actuated to record a message by the user. The present invention is in no way limited to any particular audio message, but contemplates that such messages might include messages about meals, food in the refrigerator, or any other message. The "ERASE" icon 46 indicates that pressing a center button 26 results in erasing a message. The "NEXT" icon 48 indicates that pressing the associated right hand button 28 will play the next message.

Figure 5:
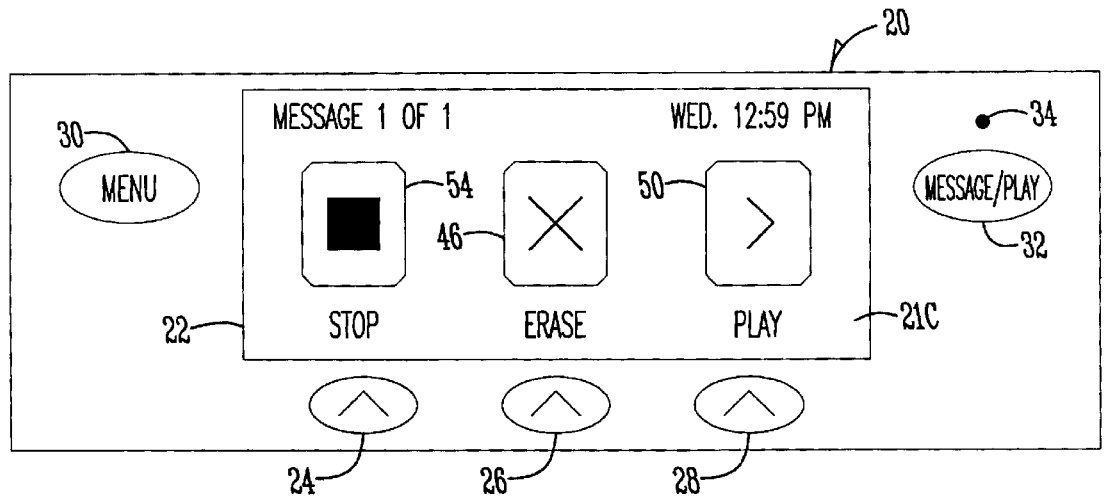

FIG. 5 illustrates a screen 21C for the user interface 20 that is displayed when a user is recording a message into the user interface 20. There is a "PLAY" icon 50 which indicates that pressing the lower button 28 will play a message. The "STOP" icon 54 indicates that pressing button 24, will stop the current message from being recorded. The "ERASE" icon 46 will erase the message being recorded. The message indicator 34 will blink to indicate the presence of messages that have been recorded in the user interface 20 but have not yet been played back.

Figure 6:
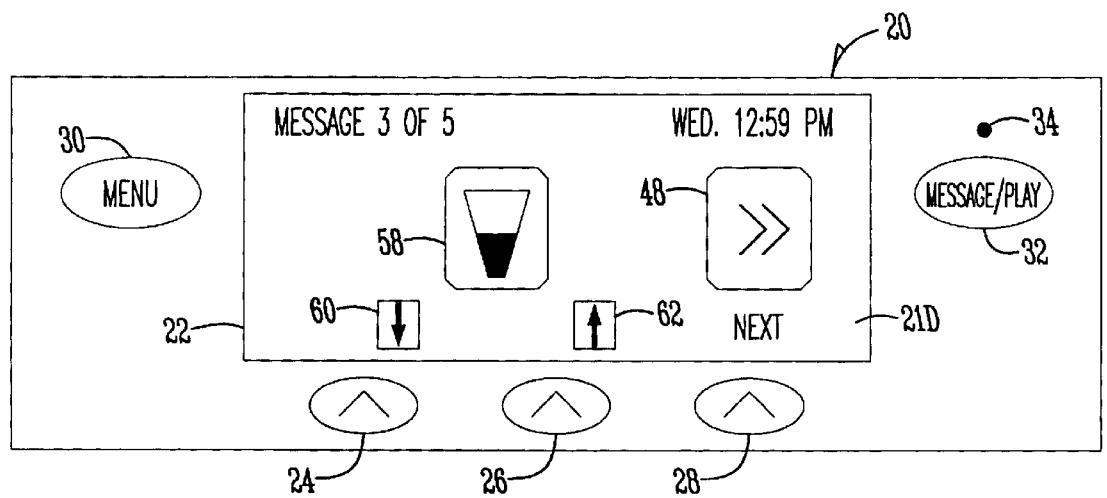

FIG. 6 depicts a screen display 21D of the user interface 20 which is normally displayed during play back of the previously recorded message. The "NEXT" icon 48 indicates that pressing the associated button 28 will advance the play back to the next recorded message. The volume icon 58 graphically indicates the current volume for play back while the directional icons 60 and 62 indicate that pressing the buttons 24, 26 will adjust the volume of the play back downwardly or upwardly as desired.

Figure 7:
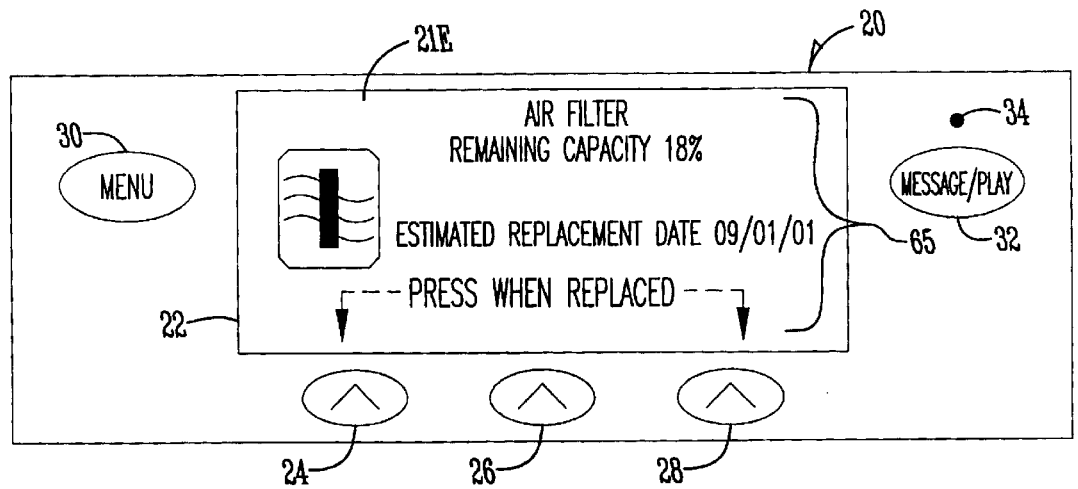
FIG. 7 is a diagram of a user interface according to one embodiment of the present invention where the display illustrates air filter replacement information.

FIG. 7 illustrates another screen display 21E of the user interface 20 which is adapted to provide for showing air filter replacement information 66. This information can include the remaining capacity of an air filter and/or an estimated replacement date. The control unit 66 (see FIG. 9) of the present invention predicts the date that the filter should be replaced. Prior to the predicted replacement date, the user interface 20 can inform the user that the filter should be ordered. For example, one month before the predicted date, the user interface 20 informs the user that the filter should be replaced. The user interface 20 then also informs the user when it is time to replace the filter.

The present invention contemplates different algorithms or determinations can be made as to how to measure the life of a particular filter. With respect to an air filter, the present invention predicts life based on time of use, for example three months. With respect to the water filter, preferably, the life is based on time (i.e. six months) or usage (i.e. 500 gallons), whichever occurs first. The present invention however contemplates that any number of rules regarding the time of use, or usage can be applied to determine when filters should be replaced which are also dependent upon the particular filters in use. Preferably, the control unit 66 (see FIG. 9) also keeps track of the remaining capacity of each filter. To keep track of remaining capacity, the assumption that the average rate of consumption will not change during the life of the filter can be applied.

When the filter is installed, the user resets the filter counter through the user interface 20. The filters remaining capacity is shown as a percentage on the display 22. Remaining capacity starts at 100% and drops down to 0% as the filter is being used. When the filter life reaches a pre-defined value, the user interface 20 informs the user that it is time to order a new filter. The reminder is prominent on the display 22 and stays visible until the user acknowledges it. The remaining capacity drops down to 0% (regardless of whether or not the time to order reminder was acknowledged). The filter reminder indicates that it is time to replace the filter. In addition, the user can press buttons 24 and 28 to indicate that the air filter has been replaced.

Figure 8:
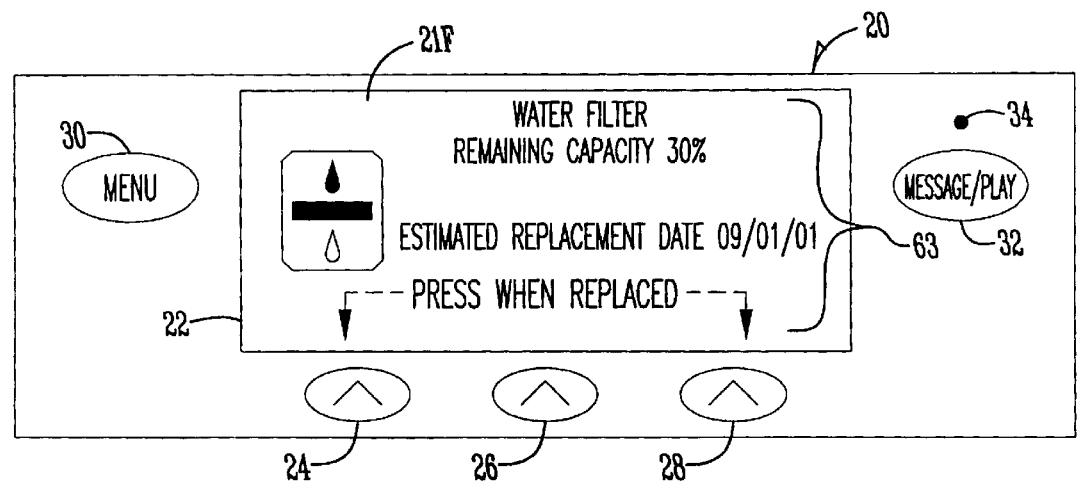
FIG. 8 is a diagram of a user interface according to one embodiment of the present invention where the display illustrates water filter replacement information.

FIG. 8 illustrates another embodiment of the display 22 of the user interface 20 showing a water filter replacement screen 21F. The screen 21F includes water filter information 65. This information can include the remaining capacity of a water filter, an estimated order date by which the water filter should be ordered in order to obtain it prior to an estimated replacement date, and/or the estimated replacement date. In addition, the user can press button 24 and 28 to indicate that the water filter has been replaced.

Figure 9:
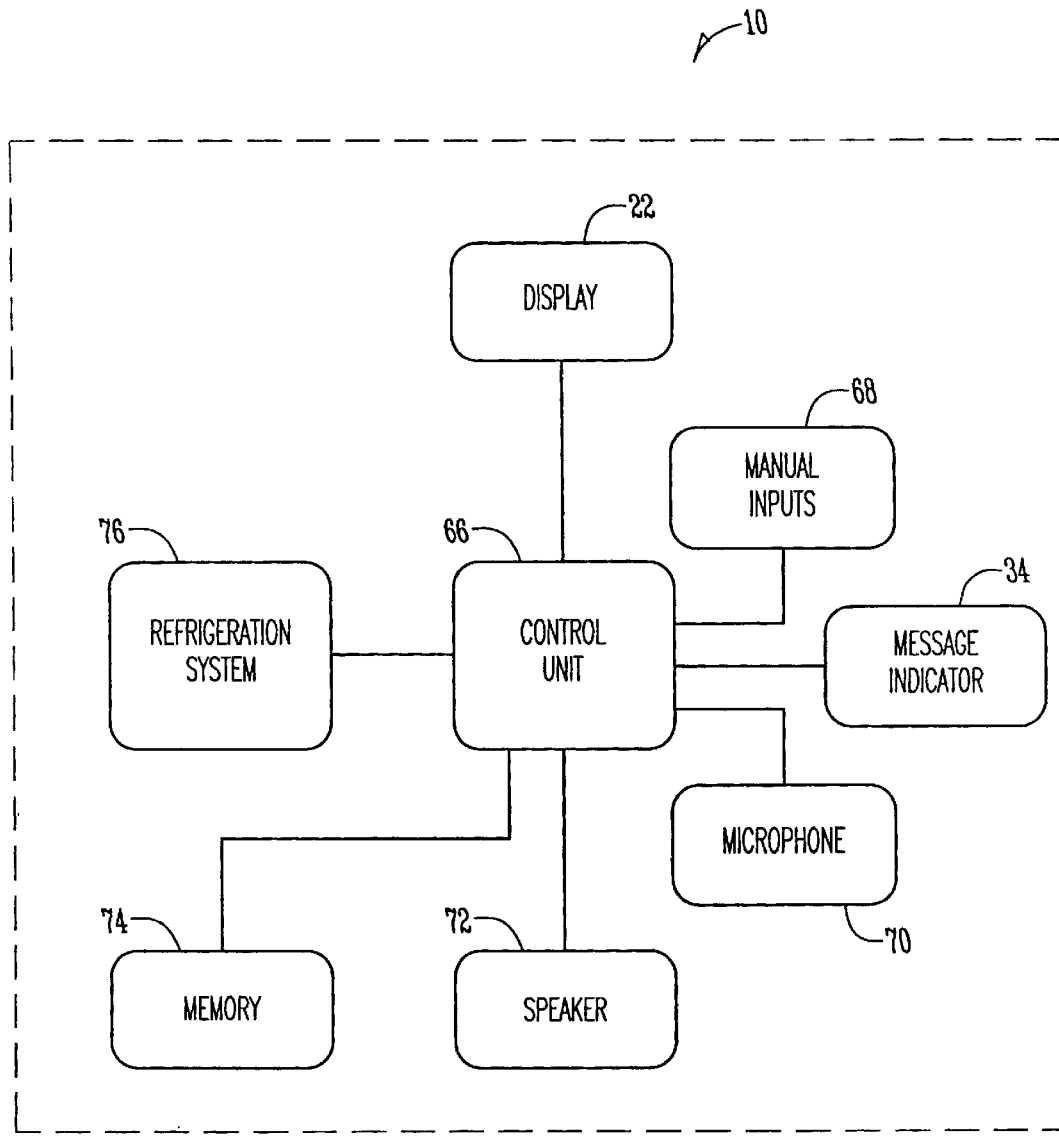
FIG. 9 is a block diagram of the interrelated features and functions of the present invention.

FIG. 9 provides a block diagram illustrating structure of the present invention. The refrigerator 10 includes a control unit 66. The control unit 66 preferably includes an intelligent control such as a microcontroller or processor, however, the present invention contemplates that any type of control unit can be used as may be appropriate in a particular design. The control unit 66 is electrically connected to a display 22. The display 22 can be used to display screens for selecting various refrigerator functions. Preferably, the display 22 is a LCD panel type display, however, the present invention contemplates that other types of displays may be used, such as may be appropriate or desirable in a particular application. The control unit 66 is also electrically connected to manual inputs 68. The manual inputs 68 can include the buttons 24, 26, 28, 30, and 32 (as shown in FIGS. 3–8). The manual inputs 68 need not be separate buttons, but can be incorporated into a touch screen display, or otherwise provided. The control unit 66 can also be used to control refrigerator functions. The control unit 66 is electrically connected to the refrigeration system 76 such that the control unit 66 can control the dispensement of ice, the dispensement of water, or other refrigerator functions. In addition, the control unit 66 is electrically connected to a microphone 70 used to transduce voice or other sound information. The control unit 66 is also electrically connected to a speaker 72 which is used to transduce sound information to play back audio messages. The control unit 66 is also electrically connected to a memory 74. The memory 74 is used to store one or more audio messages. The present invention contemplates that message playback, record, and memory functions can be implemented in the control unit through use of integrated circuits such as, but not limited to, those available from Integrated Storage Devices, Inc. (ISD). The control unit 66 is also adapted for determining refrigerator filter information such as replacement dates and/or order dates.

Thus, a refrigerator has been disclosed that provide a menu-based control system that predicts order and replace dates for filters. The present invention contemplates variations including the type of display, the type of refrigerator functions performed, the placement of the display, the number and placement of manual inputs, the type of and placement of a message indicator, and other variations within the spirit and scope of the invention.

What is claimed is:

1. A refrigerator comprising:
    a cabinet for enclosing a refrigerating compartment, the cabinet having a door for providing access to the refrigerating compartment;

a user interface operatively connected to the cabinet having a display for displaying refrigerator function selection screens and a plurality of buttons for selecting refrigerator functions associated with the refrigerator function selection screens; and a control unit operatively connected to the display and the plurality of buttons and adapted to control a plurality of refrigerator functions;

the refrigerator function associated with each of the plurality of buttons based on the refrigerator function selection screen being displayed; and the plurality of buttons being physical buttons positioned near the display.

2. The refrigerator of claim 1 wherein the plurality of buttons includes a menu button to select one of the refrigerator function selection screens.

3. The refrigerator of claim 1 wherein the plurality of buttons includes at least three buttons for selecting refrigerator functions associated with a menu screen displayed on the display.

4. The refrigerator of claim 1 wherein the refrigerator functions include a message recording function.

5. The refrigerator of claim 1 wherein the refrigerator functions include a message playback function.

6. The refrigerator of claim 1 wherein the refrigerator functions include an air filter replacement function.

7. The refrigerator of claim 1 wherein the refrigerator functions include a water filter replacement function.

8. The refrigerator of claim 1 wherein the refrigerator functions include an ice dispensement function.

9. The refrigerator of claim 1 wherein the refrigerator functions include a water dispensement function.

10. The refrigerator of claim 1 wherein the refrigerator functions include a clock function.

11. A refrigerator, comprising:

a cabinet for enclosing a refrigerating compartment;

a display operatively connected to the cabinet;

a control unit electrically connected to the display adapted for determining refrigerator filter information and displaying refrigerator filter information on the display;

the refrigerator filter information including an estimated replacement date and an ordering date associated with the refrigerator filter;

a plurality of buttons operatively connected to the control unit and positioned proximate the display; and the control unit adapted to receive a button press from the plurality of buttons daring display of the refrigerator filter information to indicate replacement of a refrigerator filter.

12. The refrigerator of claim 11 wherein the refrigerator filter information includes remaining capacity of the filter.

13. The refrigerator of claim 11 wherein the refrigerator filter information is air filter information.

14. The refrigerator of claim 11 further comprising:

a dispensement screen stored in the memory for displaying at least one dispensement function selection; and the control unit adapted to receive a button press from the plurality of buttons during display of the at least one dispensement function selection and perform an associated dispensement function.

15. A method for providing user control of a refrigerator, comprising:

providing a menu button on the refrigerator for selecting one of a plurality of refrigerator function screens;

receiving a selection from a user of one of the plurality of refrigerator function screens;

displaying the selected refrigerator function screen an the display, the selected refrigerator function screen providing a plurality of refrigerator function selections;

receiving a user selection of one of the plurality of refrigerator function selections by receiving a button press from one of a plurality of buttons positioned proximate the display such that the plurality of refrigerator function selections are associated with the plurality of buttons; and performing the selected refrigerator function.

16. The method of claim 15 wherein the step of receiving a selection from a user of one of the plurality of refrigerator function screens is receiving one or more menu button presses from the user to select one of the plurality of refrigerator function screens.

17. A method for providing refrigerator filter information comprising:

providing a display on a refrigerator and a plurality of buttons positioned near the display;

displaying on the display a date associated with a refrigerator filter; and receiving a button press from the plurality of buttons during display of the date associated with the refrigerator filter to indicate replacement of the refrigerator filter.

18. The method of claim 17 wherein the date is an estimated replacement date for the filter.

19. The method of claim 17 wherein the date is an ordering date associated with the filter.

20. The method of claim 17 wherein the refrigerator filter is an air filter.

21. The method of claim 19 wherein the refrigerator filter is a water filter.

* * * * *